US007031656B2

(12) United States Patent
Hatakeyama et al.

(10) Patent No.: US 7,031,656 B2
(45) Date of Patent: Apr. 18, 2006

(54) HANDS-FREE TELEPHONE CONVERSATION SYSTEM AND RELAY DEVICE IN HANDS-FREE TELEPHONE CONVERSATION SYSTEM

(75) Inventors: Takeshi Hatakeyama, Neyagawa (JP); Masaaki Tomoda, Suita (JP); Teruaki Ata, Ibaraki (JP); Ken-ichi Moriguchi, Neyagawa (JP); Tsuyoshi Kindo, Sennangun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 521 days.

(21) Appl. No.: 10/211,382

(22) Filed: Aug. 5, 2002

(65) Prior Publication Data

US 2003/0027607 A1    Feb. 6, 2003

(30) Foreign Application Priority Data

Aug. 6, 2001    (JP)    ............................. 2001-237400

(51) Int. Cl.
*H04B 17/02*    (2006.01)
(52) U.S. Cl. .................... 455/11.1; 455/41.1; 455/41.2; 455/41.3; 455/569.1; 455/569.2
(58) Field of Classification Search ............... 455/41.1, 455/569.1, 11.1, 7, 569.2, 555, 557, 456, 455/41.2, 41.3
See application file for complete search history.

(56) References Cited

U.S. PATENT DOCUMENTS

| 5,809,141 A | * | 9/1998 | Dent et al. ................... 380/247 |
| 6,397,086 B1 | * | 5/2002 | Chen ........................ 455/569.2 |
| 2002/0132585 A1 | * | 9/2002 | Palermo et al. ................ 455/41 |
| 2002/0142803 A1 | * | 10/2002 | Yamamoto ................... 455/557 |

FOREIGN PATENT DOCUMENTS

JP    11-146460    5/1999

* cited by examiner

*Primary Examiner*—Quochien B. Vuong
*Assistant Examiner*—Sanh Phu
(74) *Attorney, Agent, or Firm*—Wenderoth, Lind & Ponack, L.L.P.

(57) ABSTRACT

A hands-free telephone conversation system includes a communication device having a microphone that receives a voice from a user, a speaker that outputs the other party's voice, a control unit that detects the status of the wireless communication, and a local wireless communication unit that wirelessly communicates with a relay device. The relay device includes a microphone that receives the voice from the user, a local wireless communication unit that wirelessly communicates with the communication device, a communication control unit that detects the status of the wireless communication, a microphone switch unit that switches the voice input reception of the microphone, and a network communication unit that sends and receives the voice to and from the other party's communication device through a network.

16 Claims, 8 Drawing Sheets

HANDS-FREE TELEPHONE CONVERSATION SYSTEM AND RELAY DEVICE IN HANDS-FREE TELEPHONE CONVERSATION SYSTEM

BACKGROUND OF THE INVENTION (1) Field of the Invention

The present invention relates to a hands-free telephone conversation system in which a local communication system connects a communication device and a relay device, wherein a user can communicate with the other party's communication device using the communication device.

The local communication system utilizes a short distance wireless communication method that enables adjacent devices to connect wirelessly at certain frequencies by, for example, Bluetooth®. Hereafter, the local communication system is used in this sense.

(2) Description of the Prior Art

Conventionally, there is a communication system that enables two communication devices to communicate by connecting wirelessly. When the wireless communication between these communication devices is blocked by a change of radio waves and so forth, there is a method, as a countermeasure, to send a substitute message to the other party's communication device through a network (for example, see Japanese Laid-Open Patent Application No. H11-146460).

FIG. 1 is a block diagram that shows a conventional structure of a communication system. The communication system comprises a communication device 1, a base station 2, a network 3 and the other party's communication device 4.

While the base station 2 includes a wireless communication unit 21, a central control unit 22, a cable communication unit 24, the other party's communication device 4 includes a voice input unit 41 and a voice output unit 42.

The prior communication system, which has the above-mentioned structure, operates as follows:

While the communication device 1 communicates wirelessly with the base station 2 by wireless communication unit 21, the base station 2 communicates with the other party's communication device 4 through the cable communication unit 23 and the network 3.

At the wireless communication path between the communication device 1 and the base station 2, when the wireless communication is in a normal state, the base station 2 receives voice signals from the communication device 1 by using the wireless communication unit 21, and sends the voice signals to the other party's communication device 4 by using the cable communication 23 and the network 3. The base station 2 also receives the voice signals from the other party's communication device 4 through the network 3 and by using the cable communication unit 23, and sends the voice signals to the communication device 1 by using the wireless communication unit 21. Thus, when the wireless communication path is in a normal state, a telephone conversation is realized.

On the other hand, at the above-mentioned wireless communication path, when it is impossible to use the wireless communication path because the status of radio waves has changed, or the communication device 1 is out of a wireless communication area of the base station 2, the base station 2 cannot detect the communication device 1 by using the wireless communication unit 21, and therefore, detects a disconnection of the wireless communication with the communication device 1 and processes the situation accordingly.

Namely, when the base station 2 detects a disconnection of the wireless communication, the central control unit 22 produces an absent message like "It is impossible to communicate because the other party is out of the radio waves area." that the message memory unit 24 memorizes beforehand, and instructs the cable communication unit 23 to send the absent message. The cable communication unit 23 then sends the absent message to the other party's communication device 4 through the network 3.

Thus, as a general rule, in the prior communication system that uses wireless communication, when it becomes impossible to use the wireless communication path, the base station 2 acts as a relay device, and sends the absent message to the other party's communication device 4.

Thus, in a hands-free telephone conversation system that comprises a communication device and a relay device that are connected through local wireless communication, it may be possible to use the above-mentioned measure when it is impossible to use the local wireless communication path.

However, it is not appropriate to apply the above-mentioned measure to disconnection of the communication path connected through a local wireless communication path in the afore-said hands-free telephone conversation system because there are many momentary disconnections in the communication path that is connected through local wireless communication. Generally speaking, a momentary disconnection means a very short power failure brought on by a thunderbolt and so forth. The momentary disconnection mentioned here means a very short disconnection of the local wireless communication path by a change in the status of radio waves and so forth.

In other words, in the local wireless communication path, the status of communication frequently changes from connection to short disconnection and then again to connection, and therefore, it may confuse the other party to send an absence message like "It is impossible to communicate because the other party is out of the radio waves area." The other party may disconnect the telephone conversation although a relay device and the other party's communication device are able to establish a telephone conversation. Thus, the above-mentioned measure is not appropriate when a momentary disconnection occurs in the local wireless communication path. Especially, when the other party does not assume that the user is using the hands-free telephone conversation system that connects a communication device and a relay device, the other party cannot understand causes of interruption of communication and interruption of voice resulting from a momentary disconnection, so it is highly likely to cause a misunderstanding of the other party.

On the other hand, when measures are not taken when a momentary disconnection occurs in the local wireless communication path, there is a problem that the other party is inconvenienced because the momentary disconnection causes interruptions of communication and voice during a telephone conversation. Further, as was stated above, when the other party does not assume the use of the hands-free telephone conversation system, there is a problem that the other party's inconvenience can be greater.

Furthermore, because of a momentary disconnection in the communication path that is connected through local wireless communication, the status of the wireless communication becomes off and the connection does not recover within a short time, yet the telephone conversation between a relay device and a communication device goes on. Accordingly, there is a problem that the telephone charge will continue to increase.

SUMMARY OF THE INVENTION

In view of the foregoing, it is the primary object of this invention to provide a hands-free telephone conversation system using local wireless communication that can reduce an inconvenience to the other party of the telephone conversation toward interruption of the voice and so forth when a momentary disconnection in local wireless communication occurs.

Further, the second object is to provide a hand-free telephone conversation system that can keep down the charge for an unnecessary telephone conversation when a momentary disconnection in the local wireless communication path occurs, communication falls into abnormal status, and cannot recover to normal status in a short period of time.

To achieve the above-mentioned objects, the following technical methods are employed.

In other words, to achieve the primary object, the hands-free telephone conversation system according to the present invention comprises a communication device and a relay device, wherein the communication device includes: a first voice input unit operable to receive voice from a user; a voice output unit operable to output the voice of the other party of the telephone conversation; and a first wireless communication unit operable to send and receive the voice to and from the relay device wirelessly, wherein the relay device includes: a second voice input unit operable to receive voice from a user; a second wireless communication unit operable to send and receive the voice to and from the communication device wirelessly; a first wireless communication status detection unit operable to detect a status of wireless communication between the first wireless communication unit and the second wireless communication unit; a voice input switch unit operable to select either the first voice input unit or the second voice input unit depending on a detection result of the first wireless communication status detection unit; and a network communication unit operable to send the voice that is received by the first voice input unit or the second voice input unit selected by the voice input switch unit to the communication device of the other party of the telephone conversation through the communication line network.

Then, to achieve the second object, the present invention is a hands-free telephone conversation system comprising a communication device and a relay device, wherein the communication device includes: a first voice input unit operable to receive voice from a user; a voice output unit operable to output voice from the other party of the telephone conversation; and first a wireless communication unit operable to send and receive voice to and from the relay device wirelessly, wherein the relay device includes: a second wireless communication unit operable to send and receive the voice to and from the communication device wirelessly; a first wireless communication status detection unit operable to detect the status of the wireless communication between the first wireless communication unit and the second wireless communication unit; a network communication unit operable to send and receive the voice to and from the other party's communication device through the communication line network; and a network communication disconnection unit operable to cut off the connection with the other party's communication device of a telephone conversation through the communication line network, depending on a detection result of the first wireless communication status detection unit.

The present invention is also realized as an invention of a relay device that realizes this kind of a hands-free telephone conversation system. In other words, the relay device according to the present invention receives a user's voice wirelessly from a communication device that receives the voice from the user, and comprises: a voice input unit operable to receive voice from the user; a wireless communication unit operable to send and receive voice to and from the communication device wirelessly; a wireless communication status detection unit operable to detect the status of the wireless communication with the communication device; a voice input switch unit operable to select the communication device or the voice input unit depending on a detection result of the wireless communication status detection unit; and a network communication unit operable to send the voice received from the communication device or the voice input unit selected by the voice input switch unit to the other party's communication device through the communication line network.

Further, the present invention is also realized as a hands-free telephone conversation method that makes the components in a hands-free telephone conversation system performs the following steps. In other words, it is a hands-free telephone conversation method for a system comprising a communication device and a relay device, wherein the communication device performs a method that includes: a first voice input step for receiving voice from a user; a voice output step for outputting a voice from the other party of the telephone conversation; and a first wireless communication step for sending and receiving the voice to and from the relay device wirelessly, the relay device performs a method including: a second wireless communication step for sending and receiving the voice to and from the communication device wirelessly; a wireless communication status detection step for detecting the status of the wireless communication between the first wireless communication step and the second wireless communication step; a network communication step for sending and receiving the voice to the communication device of the other party of the telephone conversation through the communication line network; and a network communication disconnection step for cutting of the connection with the communication device of the other party of the telephone conversation through the communication line network, depending on a detection result of the wireless communication status detection step.

By the above-mentioned technical methods, even if the status of the local wireless communication path falls into abnormal status because of a momentary disconnection, and recovers normal status by reestablishment of connection, by switching the microphone to receive the user's voice depending on the status in the local wireless communication path, the user's voice can be sent to the other party without an interruption of voice, and therefore, the inconvenience to the other party due to interruptions of communication and voice can be kept down.

Furthermore, even if the status of the local communication path becomes abnormal because of a momentary disconnection, and it is difficult to reestablish the connection, the present telephone conversation will be cut off after the passage of a certain amount of time without a user's operation, and therefore, it is possible to prevent the telephone charges from increasing without the user noticing that the present telephone conversation continues.

BRIEF DESCRIPTION OF THE DRAWINGS

These and other objects, advantages and features of the invention will become apparent from the following description thereof taken in conjunction with the accompanying drawings that illustrate a specific embodiment of the invention. In the

DRAWINGS

Figure 1:
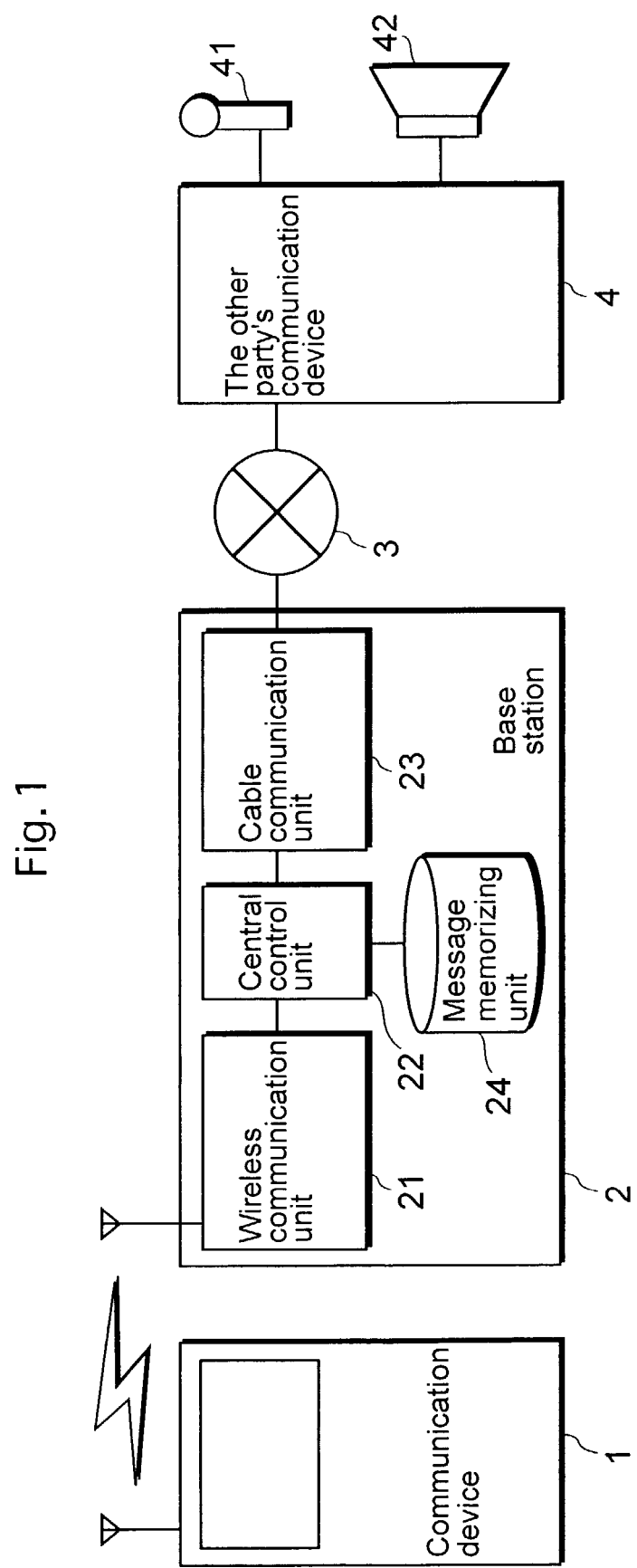

FIG. 1 is a block diagram that shows a structure of the conventional communication system.

Figure 2:
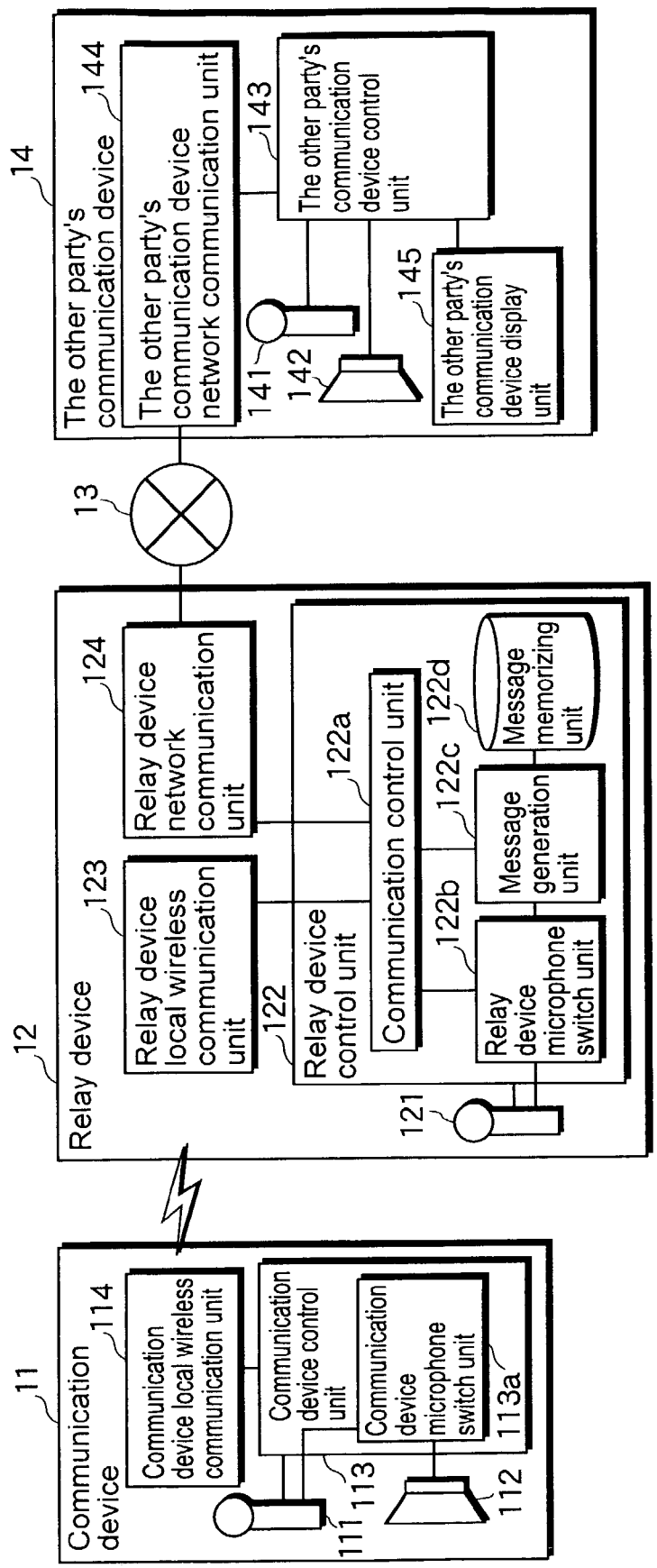

FIG. 2 is a block diagram that shows a structure of a hands-free system that uses local wireless communication according to the embodiment of the present invention and a structure of a relay device in the system.

Figure 3:
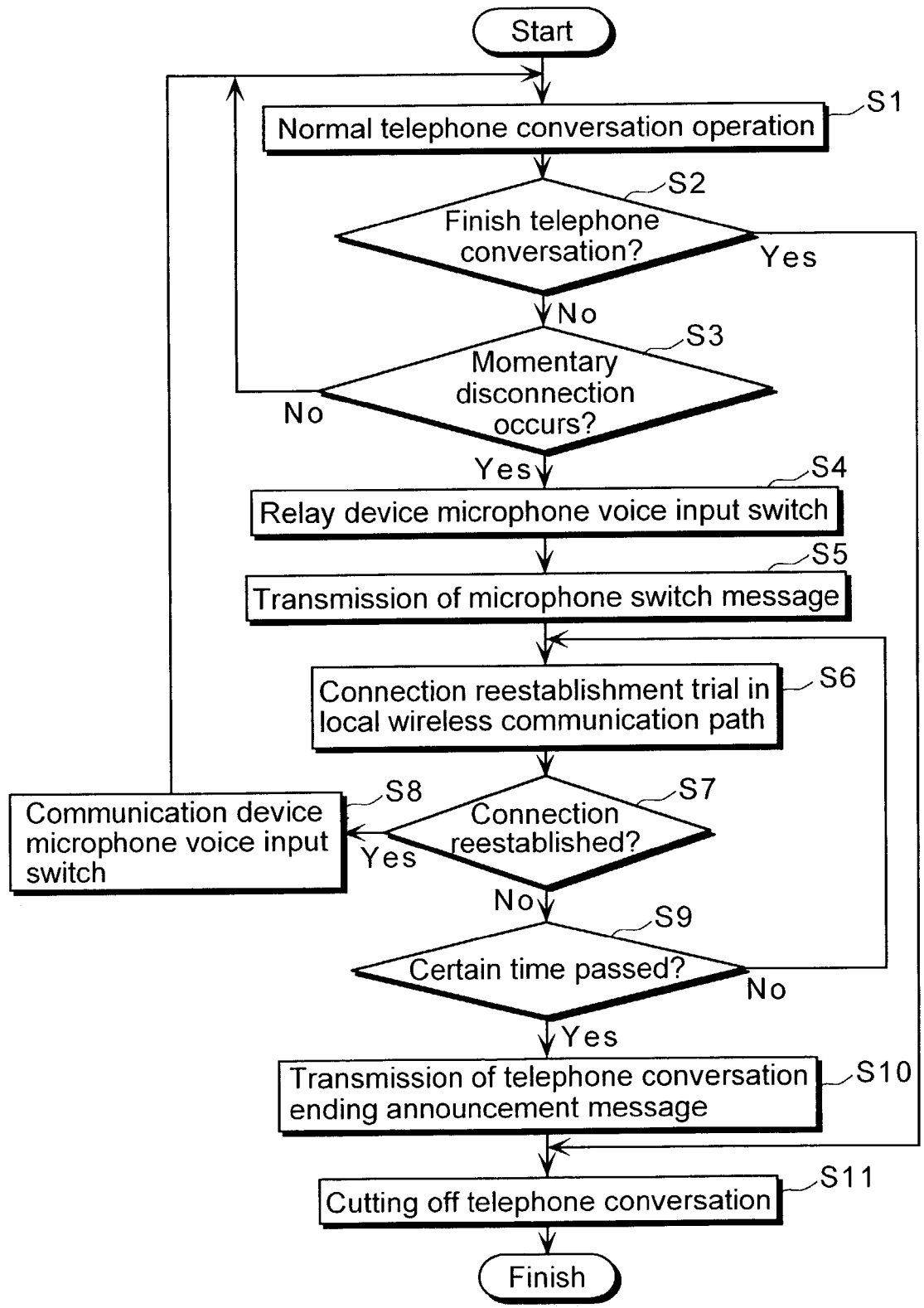

FIG. 3 is a flow chart that shows an overall operation of the system.

Figure 4B:
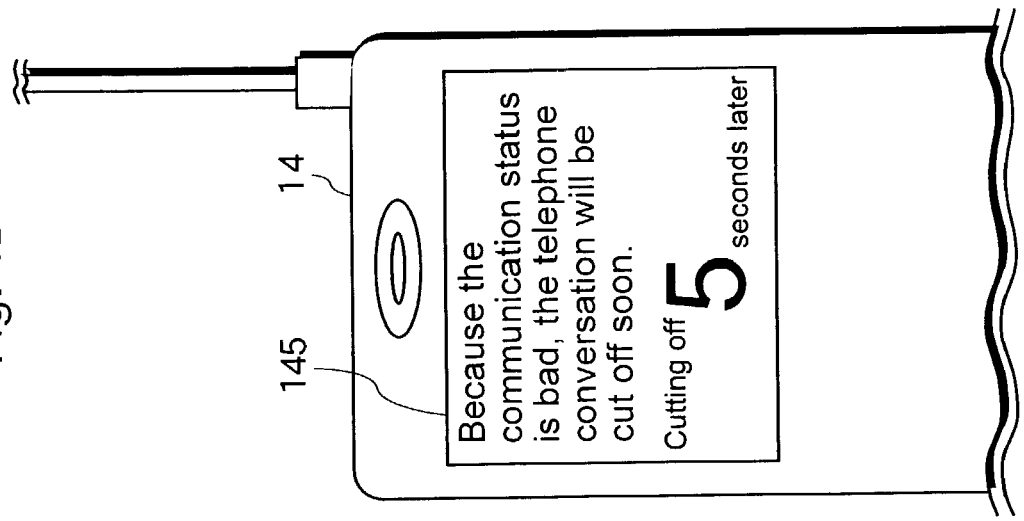
Figure 4A:
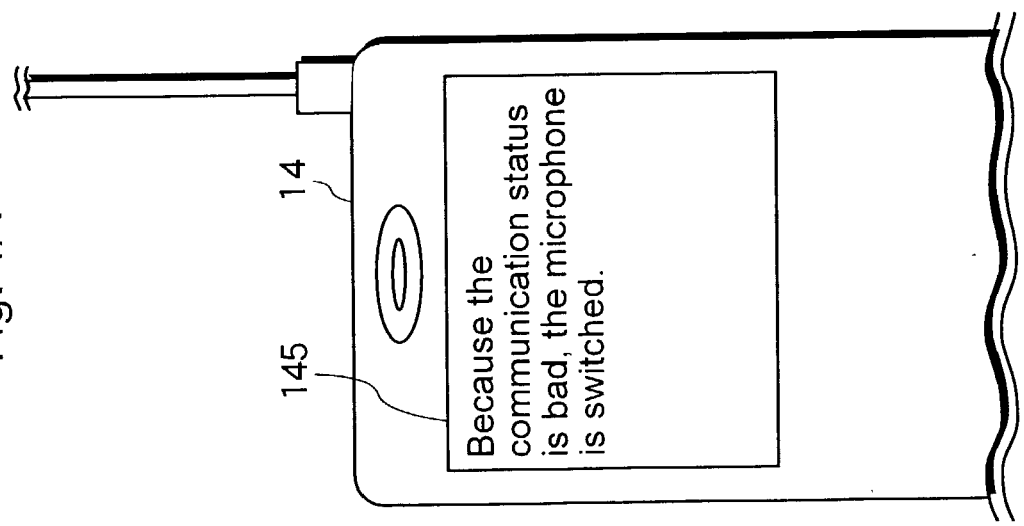

FIG. 4A is a diagram that shows an example screen of a microphone switch message of the other party's communication device.

FIG. 4B is a diagram that shows an example screen of the telephone conversation ending announcement message.

Figure 5:
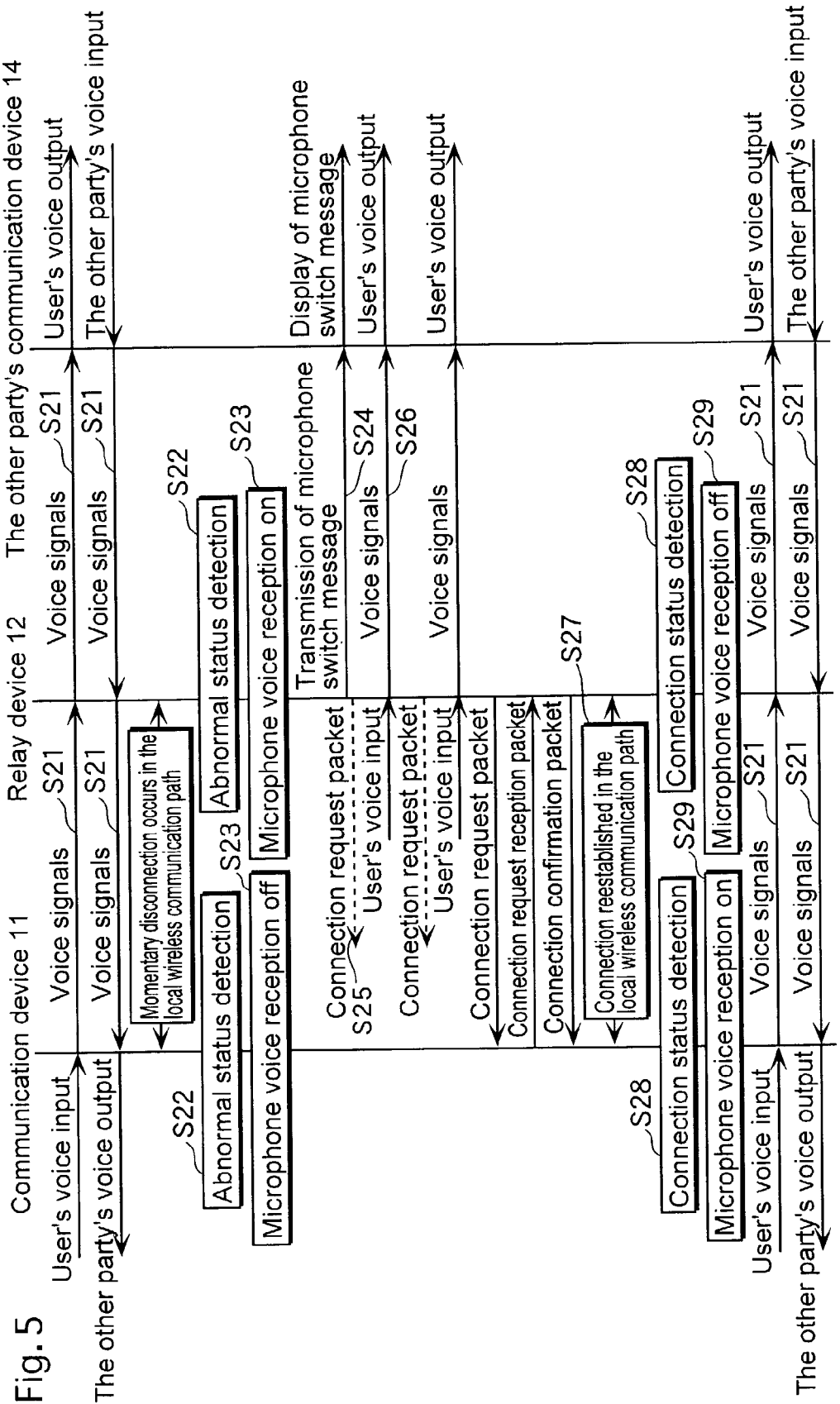

FIG. 5 is a sequence diagram that shows the flow of operations of each device comprising the system when a connection is recovered after a temporary disconnection in the local wireless communication path.

Figure 6:
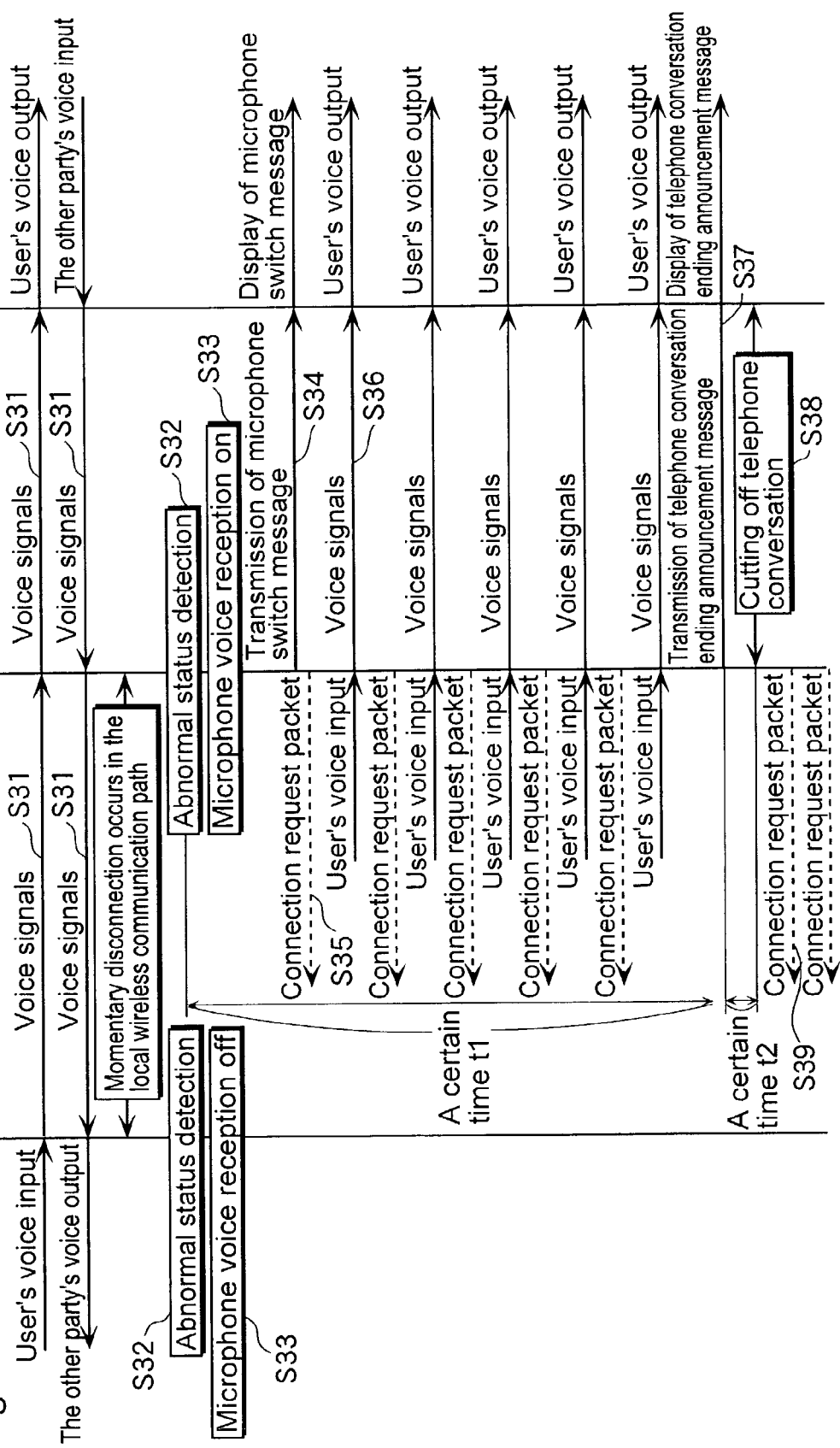

FIG. 6 is a sequence diagram that shows the flow of operations of each device comprising the system when a connection is not recovered after a temporary disconnection in the local wireless communication path.

Figure 7:
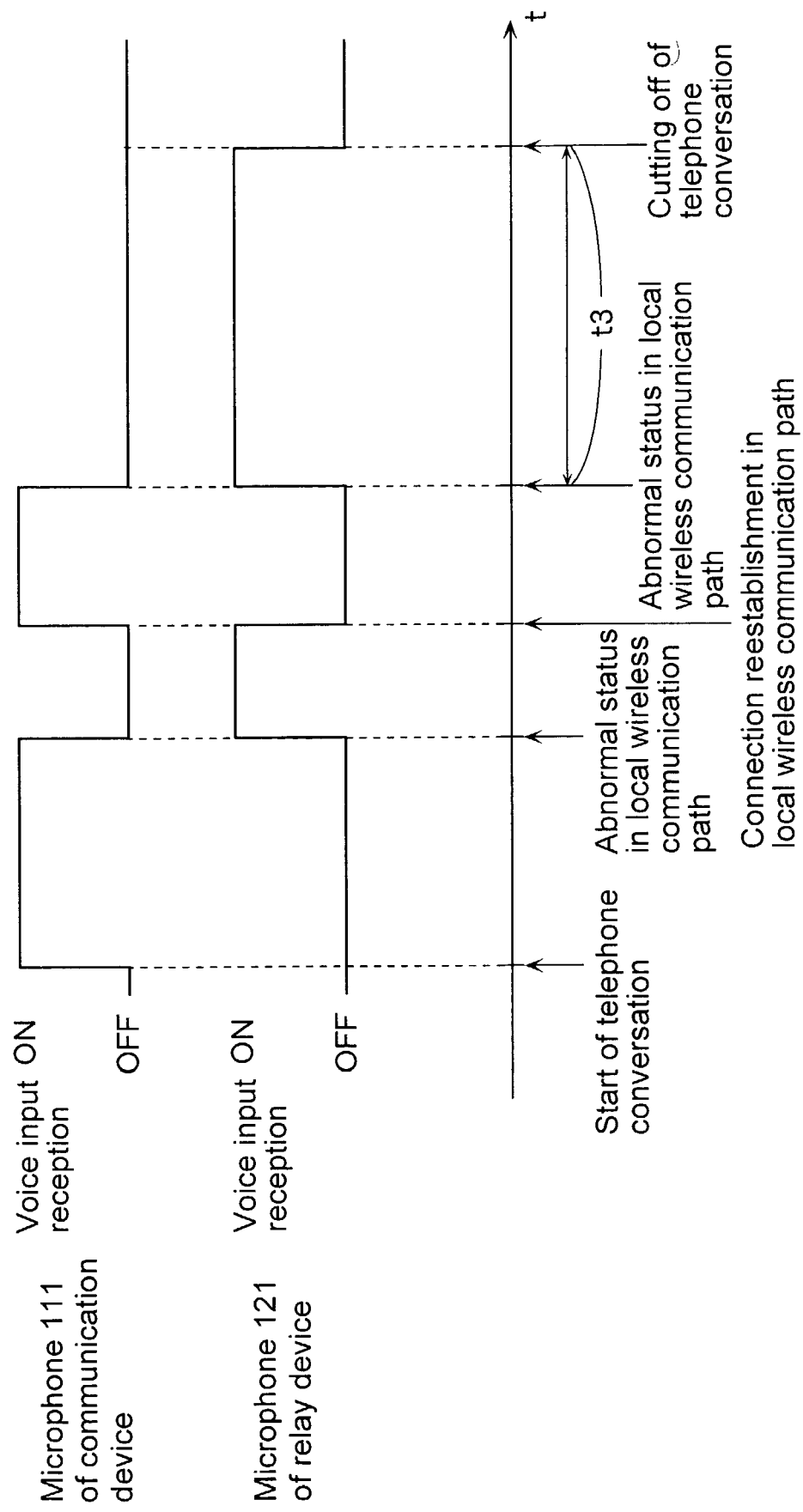

FIG. 7 is a timing chart that shows the status of switching a microphone that receives voice.

Figure 8:
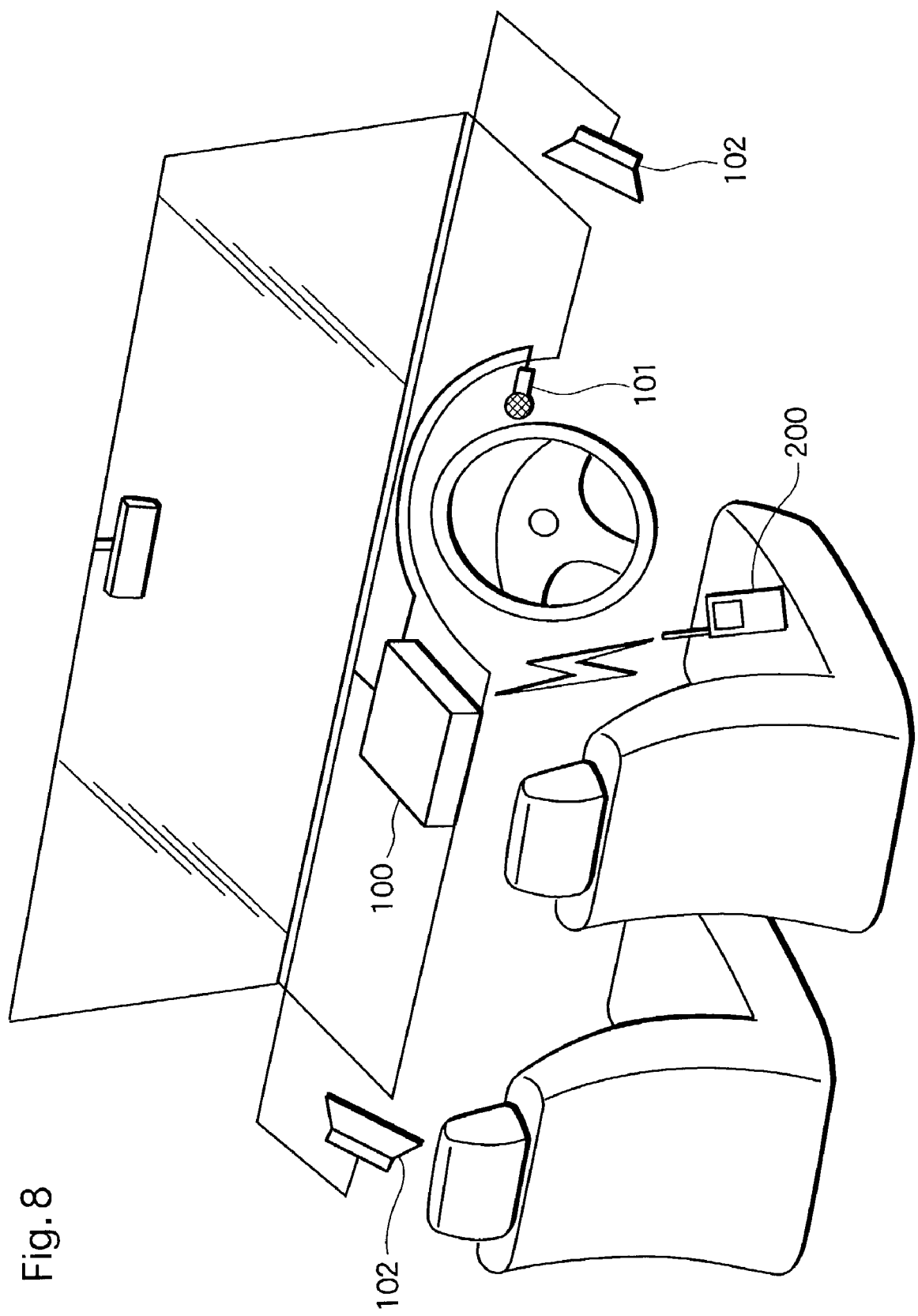

FIG. 8 is a diagram that shows an example of using the system.

DESCRIPTION OF THE PREFERRED EMBODIMENT(S)

The present embodiment of the present invention will be explained below with reference to the figures.

FIG. 2 is a function block diagram that shows the structure of the hands-free telephone conversation system using local wireless communication and the structure of the relay device in the present system according to the present embodiment of the present invention.

This hands-free telephone conversation system connects a communication device and a relay device through local wireless communication, realizes a telephone conversation between the communication device and another remote communication device, and comprises a communication device 11, a relay device 12, a network 13 and the other party's communication device 14.

The communication device 11 is a hands-free telephone conversation device with local wireless communication function, and includes a microphone 111, a speaker 112, a control unit 113 and a local wireless communication unit 114 of the communication device. The local wireless communication function, represented by Bluetooth®, has a communication interface with a close range wireless communication system that enables wireless connection between adjacent devices by using certain frequencies, and conducts wireless communication with another device that also has the communication interface. The communication path between the communication device 11 and the relay device 12 that are connected through the local wireless communication function is called the local wireless communication path. The establishment of a connection through the local wireless communication is done by the transmission of a "connection request packet", a "connection request reception packet" and a "connection confirmation packet" between the communication device 11 and the relay device 12. The connection request packet is a packet that includes device identification information and connection request information that requires the connection of wireless communication. The connection request reception packet is a packet that includes device identification information and connection request packet reception completion information that indicates the reception of the connection request packet. The connection confirmation packet is a packet that includes connection establishment confirmation information that indicates the confirmation that the connection of local wireless communication has been established. The device identification information means the information by which a device can identify another device, for example, the production number of the device.

The microphone 111 of the communication device receives the voice from a user, changes the voice into voice signals, and sends the voice signals to the communication device control unit 113.

The speaker 112 of the communication device outputs the other party's voice, receives the voice signals sent by the other party's communication device 14 through the communication device control unit 113, changes the voice signals into voice, and outputs the voice.

The communication device control unit 113 is a CPU that controls the other devices comprising the communication device 11, and controls the functions of a hands-free telephone conversation device, for example, the function that receives and sends voice signals, local wireless communication function and so forth. In other words, the communication device control unit 113 performs the processing of an instruction to communicate to the local wireless communication unit 114 of the communication device, an instruction to send voice signals, and an instruction to output the voice to the speaker 112 of the communication device. This communication device control unit 113 receives the communication status detection signals, judges the communication status detection signals, sends the instructions based on the communication status detection signals to the local wireless communication unit 114 and the microphone switch unit 113a of the communication device 11. The communication status detection signals, mentioned here, are the signals to indicate the status of communication of the local wireless communication path between the local wireless communication unit 114 of the communication device and the local wireless communication unit 123 of the relay device 12.

The microphone switch unit 113a of the communication device is the processing unit that controls the switch turning on or off to receive voice at the microphone 111 of the communication device. This microphone switch unit 113a receives the switch instructions of on or off for the microphone 111 from the communication device control unit 113, and turns on or off the voice input of the microphone 111.

The local wireless communication unit 114 of the communication device is a communication interface with a close range wireless communication system, like an antenna, which communicates by local wireless communication with the local wireless communication unit 123 of the relay device, and has the functions to detect the status of communication in the local wireless communication path and send the communication status detection signals to the control unit 113 of the communication device. This local wireless communication unit 114 of the communication device detects whether the status of communication in the local wireless communication path is normal or abnormal by a presence or absence of receiving a packet from the local wireless communication unit 123 of the relay device, and sends the communication status detection signals to the control unit 113 of the communication device.

The relay device 12 is a cellular phone with a local wireless communication function and includes the microphone 121, the control unit 122, the local wireless communication unit 123 and the network communication unit 124. It is possible to use this relay device 12 as a cellular phone.

The microphone 121 of the relay device receives the voice input from a user and changes the inputted voice to voice signals. When the relay device 12 is used as the relay device 12 of the present hands-free telephone conversation system, the microphone 121 can switch whether it may or may not receive voice from the user by the instructions of the microphone switch unit 122b of the relay device according to the status of the communication in the local wireless communication path. When the microphone 121 receives the voice input from a user, the microphone 121 changes the inputted voice to voice signals, and sends the voice signals to the control unit 122 of the relay device. When the relay device 12 is used as a cellular phone, the relay device 12 receives the voice input from the user of the cellular phone, changes the inputted voice to voice signals, and sends the voice signals to the control unit 122 of the relay device.

The control unit 122 of the relay device is a CPU, and controls the other devices that comprise the relay device 12, and also controls the functions of a cellular phone with a local wireless communication function, for example, the function to send and receive calls, a local wireless communication function and so forth. Namely, this control unit 122 of the relay device instructs network communication unit 124 of the relay device to send and receive calls and send voice signals, and also instructs the local wireless communication unit 123 to communicate and send voice signals. The control unit 122 of the relay device includes the communication control unit 122a, the microphone switch unit 122b, the message generation unit 122c, and the message memorizing unit 122d of the relay device.

The communication control unit 122a of the relay device is the processing unit that controls the communication of the local wireless communication unit 123 and the network communication unit 124 of the relay device, and sends the instructions accompanying the above-mentioned communication control to the microphone switch unit 122b of the relay device and the message generation unit 122c. The above-mentioned communication control includes: the judgment on the communication status detection signals, the instruction to try reestablishment of the connection in the local wireless communication path, and the measurement of the time for the status. The communication control unit 122a has a timer within it to measure the time for the status. The instructions accompanying communication control include: the instruction to switch on or off of receiving voice by the microphone 121 of the relay device, and the instruction to generate the telephone conversation ending announcement message. This communication control unit 122a of the relay device judges the communication status detection signals, performs the processing of the above-mentioned communication control and the above-mentioned instructions accompanying the communication control based on the information of the communication status detection signals.

The microphone switch unit 122b of the relay device is a processing unit that controls the switch turning on or off to receive voice at the microphone 121 of the relay device. This microphone switch unit 122b of the relay device receives the instruction to turn on or off to receive voice at the microphone 121 of the relay device from the communication control unit 122a of the relay device, processes to turn on or off to receive voice at the microphone 121 of the relay device, and also performs the processing to send the instruction to generate the microphone switch message to the message generation unit 122c of the relay device.

The message generation unit 122c is the processing unit that generates the microphone switch message and the telephone conversation ending announcement message. The microphone switch message includes the letters, voice and so forth that inform the other party that the microphone to receive voice from the user has switched from the microphone 111 of the communication device to the microphone 121 of the relay device. The telephone conversation ending announcement message includes the letters, voice and so forth that inform the other party in advance that the existing conversation will be terminated in a certain amount of time. This message generation unit 122c receives the instruction to generate the microphone switch message from the microphone switch unit 122b of the relay device, generates the microphone switch message, receives the instruction to generate the telephone conversation ending announcement message, generates the telephone conversation ending announcement message, and sends the telephone conversation ending announcement message to the communication control unit 122a of the relay device.

The message memorizing unit 122d stores the microphone switch message and the telephone conversation ending announcement message, and is the memorizing device that holds the above-mentioned microphone switch message and the above-mentioned telephone conversation ending announcement message, in the condition that the message generation unit 122c can read them out.

The local wireless communication unit 123 of the relay device is a communication interface with a close range wireless communication system, like an antenna, which communicates by local wireless communication with the local wireless communication unit 114 of the communication device, and functions to detect the status of the communication in the local wireless communication path, and to send the communication status detection signals to the communication control device 122a of the relay device. This local wireless communication unit 123 of the relay device detects whether the status of communication is normal or abnormal by a presence or absence of receiving a packet from the local wireless communication unit 114, and sends the communication status detection signals to the communication control unit 122a of the relay device.

The network communication unit 124 comprises an antenna and a communication interface and so forth that communicate wirelessly with the base station and so forth, and communicate with the other party's network communication unit 144 through the network communication 13.

The network communication 13 comprises a telephone line and so forth, and a communication line that includes a base station and a telegraph line, regardless of whether it is cable or wireless.

The other party's communication device 14 is a cellular phone connected with the network 13 by wireless communication, a fixed telephone set connected with the network 13 through cable communication, and so forth, and includes the microphone 141, the speaker 142, the communication control unit 143, the network communication 144, and the communication device display 145 of the other party's communication device.

The microphone 141 of the other party's communication device receives the voice from the other party, changes the inputted voice into voice signals, and sends the voice signals to the control unit 143 of the other party's communication device.

The speaker 142 of the other party's communication device outputs the user's voice, receives the voice signals sent by the communication device 11 through the control unit 143 of the other party's communication device, changes the voice signals into voice, and outputs the voice.

The control unit 143 of the other party's communication device comprises a CPU and so forth, which controls the other parts comprising the other party's communication device 14, controls the functions of a cellular phone and so forth, for example, the function to send and receive calls, and the function to send or receive voice signals. In other words, this control unit 143 of the other party's communication device instructs the network communication unit 144 of the other party's communication to send or receive calls, to send voice signals, and also instructs the display unit 145 of the other party's communication device to display the microphone switch message and the telephone conversation ending announcement message.

The network communication unit 144 of the other party comprises an antenna, a communication interface and so forth that communicate with the base station and so forth by cable or wireless, and communicates with the network communication unit 124 of the relay device through the network 13.

The display unit 145 of the other party's communication device is a display to indicate telephone numbers and so forth, and to indicate the microphone switch message and the telephone conversation ending announcement message, which the control unit 143 of the other party's communication device has received through the network communication unit 144 of the other party's communication device.

The processing of the operations when a momentary disconnection occurs in the local wireless communication path of the relay device of the hands-free telephone conversation system and the present system will be explained below with reference to FIG. 3.

FIG. 3 is a flow diagram that shows the overall processing of the operations of the hands-free telephone conversation system, using local wireless communication, according to the embodiment of the present invention.

Initially, when the telephone conversation by the hands-free telephone conversation system starts, using the local wireless communication, this hands-free telephone conversation system will process a normal telephone conversation (S1). The processing of the operations of a normal telephone conversation is as follows:

Namely, the microphone 111 of the communication device receives the voice of a user, changes the user's voice to voice signals, and sends the voice signals to the control unit 113 of the communication device, which instructs the local wireless communication unit 114 to send the voice signals. Based on the instruction, the local communication unit 114 sends the voice signals to the local wireless communication unit 123 of the relay device.

Next, the local wireless communication unit 123 receives the voice signals, sends the voice signals to the communication control unit 122a, which instructs the network communication unit 124 of the relay device to send the voice signals. Based on the instruction, the network communication unit 124 of the relay device sends the voice signals to the network communication unit 144 through the network 13.

The network communication unit 144 of the other party's communication device receives the voice signals, sends the signals to the control unit 143 of the other party's communication device, which sends the voice signals to the speaker 142 of the other party's communication device. The speaker 142 changes the voice signals to the voice, and outputs the user's voice.

On the other hand, the microphone 141 of the other party's communication device receives the voice of the other party, changes the voice to voice signals, and sends the voice signals to the control unit 143 of the other party's communication device, which instructs the network communication unit 144 to send the voice signals. Based on this instruction, the network communication unit 144 of the other party's communication device sends the voice signals to the network communication unit 124 through the network 13.

Next, the network communication unit 124 of the relay device receives the voice signals, and sends the voice signals to the communication control unit 122a, which instructs local wireless communication unit 123 of the relay device to send the voice signals. Based on this instruction, the local wireless communication unit 123 of the relay device sends the voice signals to the local communication unit 114 of the communication device.

Then, the local wireless communication unit 114 receives the voice signals, sends the voice signals to the control unit 113 of the communication device, which sends the voice signals to the speaker 112 of the communication device. The speaker 112 of communication device changes the voice signals to the voice and outputs the other party's voice.

Thus, the operations of a normal telephone conversation by the present hands-free telephone conversation system are processed.

When the control unit 113 of the communication device receives the instruction from the user to end the present telephone conversation by the user pressing a button of the communication device 11 (S2) to end the telephone conversation and so forth, the control unit 113 of the communication device sends the instruction to end the telephone conversation to the local wireless communication unit 123 of the relay device through the local wireless communication unit 114. Later, the communication control unit 122a, which has received the instruction to end the present telephone conversation through the local wireless communication unit 123 of the relay device, sends the instruction to end the present telephone conversation to the network communication unit 124. Based on this instruction, the network communication unit 124 of the relay device ends the telephone conversation with the other party's communication device 14, and the telephone conversation ends (S11).

However, when the telephone conversation continues, because there is no instruction to end the telephone conversation from the user (S2), and a momentary disconnection occurs in the local wireless communication path between the local wireless communication unit 114 of the communication device and the local wireless communication unit 123 of the relay device, the local wireless communication unit 114 of the communication device and the local wireless communication unit 123 of the relay device detect the momentary disconnection (S3). Then, the local wireless communication unit 114 of the communication device sends the communication status detection signals indicating that the status of communication in the local wireless communication path is abnormal to the control unit 113 of the communication device, while the local wireless communication unit 123 sends the communication status detection signals indicating that the status of communication in the local wireless communication path is abnormal to the communication control unit 122a of the relay device.

Next, the communication control unit 122a of the relay device, which has received the communication status detection signals indicating that the status of communication in the local wireless communication path is abnormal, sends an instruction to turn on the switch of receiving the voice of the microphone 121 of the relay device to the microphone switch unit 122b of the relay device. Based on the instruction to turn the switch on, the microphone switch unit 122b turns on the switch of receiving the voice of the microphone 121 of the relay device, and receives the voice of the user (S4). Then, the microphone 121 of the relay device changes the inputted voice of the user to voice signals, and sends the voice signals to the communication control unit 122a, which sends the voice signals to the network communication unit 144 of the other party's communication device through the network communication unit 124 and the network 13. The speaker 142, in turn, changes the voice signals to the voice, and outputs the user's voice. On the other hand, the control unit 113 of the communication device, which has received the communication status detection signals indicating that the status of communication in the local wireless communication path is abnormal, sends an instruction to turn off the switch of receiving the voice of the microphone 111 of the communication device to the microphone switch unit 113a. Based on the instruction, the microphone switch unit 113a turns off the switch of receiving the voice of the microphone 111 of the communication device, and does not receive voice from the user (S4).

Further, the microphone switch unit 122b of the relay device turns on the switch of receiving the voice of the microphone 121 of the relay device, and sends the instruction to generate the microphone switch message to the message generation unit 122c. Based on the instruction, the message generation unit 122c generates the microphone switch message, with reference to the message memorizing unit 122d. Then the message generation unit 122c sends the generated microphone switch message to the communication control unit 122a, which sends the instruction to send the above-mentioned microphone switch message to the network communication unit 124 of the relay device. The network communication unit 124 of the relay device sends the above-mentioned microphone switch message to the network communication unit 144 of the other party's communication device through the network 13 (S5). Later, the control unit 143 of the other party's communication device, which has received the above-mentioned microphone switch message through the network communication unit 144 of the other party's communication device, sends an instruction to display the microphone switch message to the display unit 145 of the other party's communication device, which displays the above-mentioned microphone switch message.

FIG. 4a is a diagram that shows a sample of the display screen of the microphone switch message at the other party's communication device 14. In this way, the above-mentioned microphone switch message is, for example, displayed in letters by the display unit 145 of the other party's communication device, and can notify the other party of the switch of the microphone that received the voice.

Consequently, the communication control unit 122a sends an instruction to try a reestablishment of the connection with the local wireless communication unit 114 of the communication device in the local wireless communication path, to the local wireless communication unit 123 of the relay device. Based on the instruction to try a reestablishment of the connection, the local wireless communication unit 123 of the relay device tries to reestablish the communication with the local wireless communication unit 114 in the local wireless communication path.

Here, the processing of the operations, when the connection in the local wireless communication path is reestablished, is explained.

Initially, the communication control unit 122a sends an instruction to send the connection request packet including the device identification information about the relay device 12 and the connection request information to the local wireless communication unit 123 of the relay device, which sends, based on the instruction, the connection request packet to the local wireless communication unit 114 of the communication device.

Next, when the local wireless communication unit 114 of the communication device receives the above-mentioned connection request packet from the local wireless communication unit 123, it sends the above-mentioned device identification information and the above-mentioned connection request information included in the connection request packet, to the control unit 113 of the communication device, which receives the device identification information and the connection request information, instructs the local wireless communication unit 114 to send the connection request reception packet including the device identification information about the communication device 11 and connection request packet reception completion information. Based on the instruction, the local wireless communication unit 114 sends the connection request reception packet to the local wireless communication unit 123 of the relay device.

Consequently, when the local wireless communication unit 123 receives the connection request reception packet from the local wireless communication unit 114 of the communication device, it sends the above-mentioned device identification information and the above-mentioned reception completion information included in the connection request reception packet to the communication control unit 122a, which receives the device identification information and the reception completion information, and instructs the local wireless communication unit 123 of the relay device to send the connection confirmation packet including the connection establishment confirmation information. Based on this instruction, the local wireless communication unit 123 sends the connection confirmation packet to the local wireless communication unit 114 of the communication device. Here, by the transmission of the connection confirmation packet, the communication control unit 122a confirms that the connection in the local wireless communication path has been reestablished.

Later, when the local wireless communication unit 114 receives the connection confirmation packet from the local wireless communication unit 123 of the relay device, it sends the connection establishment confirmation information, included in the connection confirmation packet, to the control unit 113 of the communication device, which receives the connection establishment confirmation information, and confirms that the connection in the local wireless communication path has been reestablished.

By such processing of the operations, when the connection in the local wireless communication path has been reestablished (S7), the local wireless communication unit 123 of the relay device detects that the status of connection in the local wireless communication path is normal, and sends the communication status detection signals that indicate that the status of communication in the local wireless communication path is normal, to the communication control unit 122a, which sends an instruction to turn off the switch to receive voice in the microphone 121 of the relay device, to the microphone switch unit 122b of the relay device. Based on the instruction to turn the switch off, the microphone switch unit 122b turns off the switch to receive voice in the microphone 121 of the relay device (S8). The local wireless communication unit 114 of the communication device, likewise, detects that the status of connection in the local wireless communication path is normal, and sends the communication status detection signals that indicate that the status of communication in the local wireless communication path is normal, to the control unit 113 of the communication device, which sends an instruction to turn on the switch to receive voice in the microphone 111 of the communication device, to the microphone switch unit 113a of the communication device. Based on the instruction to turn the switch on, the microphone switch unit 113a turns on the switch to receive voice in the microphone 111 of the communication device (S 8).

Then, the present hands-free telephone conversation system processes the normal operations of a telephone conversation, and performs the various operations as was stated above (S1).

Thus, when a momentary disconnection in the local wireless communication path occurs, the microphone to receive voice from the user is changed from the microphone 111 of the communication device to the microphone 121 of the relay device. Then, when the connection in the local wireless communication path is reestablished, the microphone to receive voice from the user is changed again to the microphone 111 of the communication device. By doing so, it is possible to continue a telephone conversation by the hands-free telephone conversation system using the local wireless communication, without discontinuing the user's voice.

On the other hand, by the above-mentioned processing of the operations, when the connection in the local wireless communication path is not reestablished (S7), the communication control unit 122a measures the passage of a certain amount of time by a timer that it has within it (S9). In this case, until the communication control unit 122a measures the passage of a certain amount of time, it instructs the local wireless communication unit 123 to try the reestablishment of connection in the local wireless communication path, and repeats the above-mentioned processing (S6).

Then, when the communication control unit 122a measures the passage of a certain amount of time, it sends an instruction to generate the telephone conversation ending announcement message to the message generation unit 122c. Based on the instruction to generate the telephone conversation ending announcement message, the message generation unit 122c generates the telephone conversation ending announcement message, with reference to the message memorizing unit 122d. Next, the message generation unit 122c sends the generated telephone conversation ending announcement message to the communication control unit 122a, which sends an instruction to send the telephone conversation ending announcement message to the network communication unit 124 of the relay device. Based on the instruction to send, the network communication unit 124 of the relay device sends the telephone conversation ending announcement message to the network communication unit 144 of the other party's communication device through the network 13 (S110). Later, the communication control unit 143 of the other party's communication device, which has received the telephone conversation ending announcement message through the network communication unit 144, sends an instruction to display a telephone conversation ending announcement message to the display unit 145 of the other party's communication device. Then, the display unit 145 of the other party's communication unit displays the telephone conversation ending announcement message.

FIG. 4b is a diagram that shows a sample of the display screen of the telephone conversation ending announcement message at the other party's communication device 14. In this way, the above-mentioned telephone conversation ending announcement message, for example, is displayed in letters by the display unit 145 of the other party's communication device, and it is possible to notify the other party in advance that the present telephone conversation will be cut off. Here, the number at the bottom part in the center of the display unit 145 of the other party's communication device indicates the remaining seconds until the telephone conversation is cut off.

Later, the communication control unit 122a measures the passage of a certain amount of time after it has sent the instruction to send the above-mentioned telephone conversation ending announcement message, by the timer it has within it. After a certain amount of time has passed, the communication control unit 122a sends an instruction to cut off the present conversation to the network communication unit 124 of the relay device. Based on the instruction, the network communication unit 124 will cut off the telephone conversation with the other party's communication device 14, and the telephone conversation ends (S11).

FIG. 5 is a sequence diagram that shows the flow of the processing of the operations of the devices comprising the hands-free telephone conversation system when the connection has been reestablished after a momentary disconnection occurs in the local wireless communication path in the hands-free telephone conversation system using the local wireless communication according to the present invention.

Initially, before a momentary disconnection in the local wireless communication path between the communication device 11 and the relay device 12 is detected, the hands-free telephone conversation system processes the operations of a normal telephone conversation as was stated above (S 21).

Next, when a momentary disconnection in the local wireless communication path occurs, the communication device 11 detects that the status of communication in the local wireless communication path is abnormal by the local wireless communication unit 114 of the communication device while the relay device 12 detects that the status of communication in the local wireless communication path is abnormal by the local wireless communication unit 123 of the relay device (S22).

Consequently, the communication device 11 turns off the switch to receive voice in the microphone 111 of the communication device by the microphone switch unit 113a of the communication device while the relay device 12 turns on the switch to receive voice in the microphone 121 of the relay device by the microphone switch unit 122b of the relay device (S23)

Later, the relay device 12 generates the microphone switch message by the message generation unit 122c, and sends the generated microphone switch message to the other party's communication device 14, which displays the microphone switch message through the display unit 145 of the other party's communication device (S24).

Then, the relay device 12 sends the connection request packet to the communication device 11, tries several times to reestablish the connection in the local wireless communication path (S25), and at the same time, receives the voice from the user through the microphone 121 of the relay device, changes the voice into voice signals, sends the voice signals to the other party's communication device 14, which receives the voice signals, changes the voice signals to the voice, and outputs the user's voice through the speaker 142 of the other party's communication device (S26). While the relay device 12 tries to reestablish the connection in the local wireless communication path, the relay device 12 and the other party's communication device 14 repeat this processing.

At this moment, when the communication device 11 receives the connection request packet from the relay device 12, it sends the connection request reception packet to the relay device 12, which receives the connection request reception packet, and sends the connection confirmation packet to the communication device 11. By doing this, the connection in the wireless communication path between the communication device 11 and the relay device 12 is reestablished (S27). While the communication device 11 detects that the status of communication in the local wireless communication path is normal by the local wireless communication unit 114 of the communication device, the relay device 12 detects that the status of communication in the local wireless communication path is normal by the local wireless communication unit 123 (S28).

Then, while the communication device 11 turns on the switch to receive voice in the microphone 111 of the communication device (S29), the relay device 12 turns off the switch to receive voice in the microphone 121 of the relay device (S29).

Later, before a momentary disconnection in the local wireless communication path occurs again, the communication device 11, the relay device 12 and the other party's communication device 14 repeat the above-mentioned processing of the operations of the normal telephone conversation in the present hands-free telephone conversation system (S21). When a momentary disconnection in the local wireless communication path occurs again, the three devices repeat the above-mentioned processing of the operations when a momentary disconnection in the wireless communication path in the present hands-free telephone conversation system occurs.

FIG. 6 is a sequence diagram that shows the flow of the processing of the operations of the devices comprising the hands-free telephone conversation system when the connection is not reestablished after a momentary disconnection occurs in the local wireless communication path in the hands-free telephone conversation system using the local wireless communication path according to the present invention.

Initially, like the processing of the operations after the disconnection in the local wireless communication path is detected, and when a reestablishment of the connection is detected, the communication device 11, the relay device 12 and the other party's communication device 14, as was stated above, processes the operations of a normal telephone conversation in the present hands-free telephone conversation system before another momentary disconnection in the local wireless communication path is detected (S31). When a momentary disconnection in the local wireless communication path between the communication device 11 and the relay device 12 occurs, the communication device 11 detects that the status of the communication in the local wireless communication path is abnormal by the local wireless communication unit 114 while the relay device 12 detects that the status of the communication in the local wireless communication path is abnormal by the local wireless communication unit 123 (S32).

Next, like the above-mentioned processing of the operations, the communication device 11 turns off the switch to receive voice in the microphone 111 of the communication device by the microphone switch unit 113a, while the relay device 12 turns on the switch to receive voice in the microphone 121 of the relay device by the microphone switch unit 122b (S33). Then, the relay device 12 generates the microphone switch message by the message generation unit 122c, and sends the generated microphone switch message to the other party's communication device 14, which displays the microphone switch message through the display unit 145 of the other party's communication device (S34).

Furthermore, like the above-mentioned processing of the operations, the relay device 12 sends the connection request packet to the communication device 11, tries several times to reestablish the connection in the local wireless communication path (S35), and at the same time, receives the voice from the user through the microphone 121 of the relay device, changes the voice into voice signals, and sends the voice signals to the other party's device 14, which receives the voice signals, changes the voice signals to the voice through the speaker 142 of the other party's communication device, and outputs the user's voice (S36). The relay device 12 and the other party's communication device 14 repeat this processing while the relay device 12 tries to reestablish the connection in the local wireless communication path.

Later, the relay device 12 measures the passage of a certain amount of time t1 since it has detected that the status of the communication in the local wireless communication path is abnormal, by the timer that the relay device 12 has within it, generates the telephone conversation ending announcement message by the message generation unit 122c, and sends the generated telephone conversation ending announcement message to the other party's communication device 14, which displays the telephone conversation ending announcement message, through the display unit 145 of the other party's communication device (S37). Furthermore, the relay device 12 measures the passage of a certain amount of time t2 since it has sent the telephone conversation ending announcement message, by the timer that it has within it, cuts off the telephone conversation with the other party's communication device (S38). Even after the relay device 12 cuts off the telephone conversation with the other party's communication device 14, the relay device 12 sends the connection request packet to the other party's communication device 11, and continues to try a reestablishment of the connection in the local wireless communication path in preparation for the next telephone conversation (S39).

FIG. 7 is a timing chart that shows the situation to switch the microphone to receive voice in the hands-free telephone conversation system using the local wireless communication according to the present invention.

Initially, when a telephone conversation in the present hands-free telephone communication starts, the microphone switch unit 113a turns on the switch to receive voice in the microphone 111 of the communication device.

Next, when a momentary disconnection in the local wireless communication path between the communication device 11 and the relay device 12 occurs, the microphone switch unit 113a turns off the switch to receive voice in the microphone 111 of the communication device while the microphone switch unit 122b of the relay device turns on the switch to receive voice in the microphone 121 of the relay device.

Then, when the connection in the local wireless communication path has been reestablished, the microphone switch unit 113a of the communication device turns on the switch to receive voice in the microphone 111 of the communication device while the microphone switch unit 122*b* of the relay device turns off the switch to receive voice in the microphone 121 of the relay device.

Consequently, when another momentary disconnection occurs, as was stated above, the microphone switch unit 113*a* turns off the switch to receive voice in the microphone 111 of the communication device while the microphone switch unit 122*b* turns on the switch to receive voice in the microphone 121 of the relay device.

Later, after the passage of a certain amount of time t3, when the connection in the local wireless communication path is not reestablished, when the telephone conversation in the present hands-free telephone conversation system is cut off, the microphone switch unit 122*b* turns off the switch to receive voice in the microphone 121 of the relay device.

FIG. 8 is an outline drawing of the hands-free telephone conversation system loaded in a car, as an example of the hands-free telephone conversation system using the local wireless communication according to the present invention.

This hands-free telephone conversation system loaded in a car enables a hands-free telephone conversation using the local wireless communication within a car, and comprises the hands-free control device 100, which corresponds to the control unit 113 and the local wireless communication unit 114 of the communication device 11, the hands-free microphone 101 loaded in the car, which corresponds to the microphone 111 of the communication device 11, the speaker 102 loaded in the car, which corresponds to the speaker 112 of the communication device 11, and the cellular phone 200, which corresponds to the relay device 12.

Namely, the hands-free control device 100 is connected to the cellular phone 200 by the local wireless communication. When the status of the communication in this local wireless communication path is normal, the hands-free microphone 101 receives the voice of the speaker, who is the driver, changes the voice to voice signals, and the hands-free control device 100 sends the voice signals to the cellular phone 200 by the local wireless communication. Then, the cellular phone 200 receives the other party's voice, sends the voice to the hands-free control device 100 by the local wireless communication, and the speaker 102 loaded in the car outputs the voice.

Then, when a momentary disconnection occurs in the above-mentioned local wireless communication path, the cellular phone 200 switches the microphone to receive voice from the driver from the hands-free microphone 101 loaded in the car to the microphone in the cellular phone 200, sends the driver's voice to the other party of the telephone conversation, and tries to reestablish the connection with the hands-free control device 100 by the local wireless communication.

Later, when the connection between the cellular phone 200 and the hands-free control device 100 by the local wireless communication is reestablished, the cellular phone 200 switches the microphone to receive voice from the driver, from the microphone in the cellular phone 200 to the hands-free microphone 101 loaded in the car. As was stated above, the hands-free microphone 101 loaded in the car receives the voice from the driver, changes the voice to the voice signals, and the hands-free control device 100 sends the voice signals to the cellular phone 200 by the local wireless communication, and the cellular phone 200 sends the voice signals to the other party of the telephone conversation.

On the other hand, if the reestablishment of connection through the local wireless communication between the hands-free control device 100 and the cellular phone 200 is not done after the passage of a certain amount of time, the cellular phone 200 cuts off the present telephone conversation.

Thus, the present invention is, for example, realized as a hands-free telephone conversation system loaded in a car. By this hands-free telephone conversation system loaded in a car, the user, who is also a driver, not only can use a hands-free telephone conversation without the cable connection between the cellular phone 200 and the hands-free control device 100, but also can send the driver's voice to the other party of the telephone conversation, even when a momentary disconnection in the local wireless communication between the cellular phone 200 and the hands-free control device 100 occurs, and can therefore reduce the inconvenience to the other party.

Likewise, even if an abnormal connection of the local wireless communication between the cellular phone 200 and the hands-free control device 100 lasts several tens of seconds to several minutes, the present invention cuts off the present telephone conversation after the passage of a certain amount of time, and therefore reduce the charge for an unnecessary conversation.

As was explained above, according to the embodiment of the present invention, at a hands-free telephone conversation system using the local wireless communication, even when momentary disconnection in the local wireless communication path occurs, by switching the microphone that receives the user's voice to the microphone 121 of the relay device, the inconvenience to the other party due to interruptions of the communication and the user's voice can be kept down.

Likewise, even when a momentary disconnection in the local wireless communication occurs, and the establishment of a connection in the local wireless communication path is difficult, cutting off the telephone conversation after the passage of a certain time can prevent an unanticipated increase of the charge for the telephone conversation while the user does not perceive the continuation of the telephone conversation.

So far, the hands-free telephone conversation system using the local wireless communication according to the present invention has been explained based on the above-described embodiment, but the present invention is not limited to this embodiment.

For example, according to the above-mentioned embodiment, the local wireless communication unit 114 of the communication device and the local wireless communication device 123 of the relay device detect the status of the communication in the local wireless communication path, by presence or absence of receiving packet. However, it is possible that the local wireless communication unit 114 of the communication device and the local wireless communication unit 123 of the relay device detect the status of the communication in the local wireless communication by receiving a level of an electric field at the local wireless communication unit 114 of the communication device and the local wireless communication device 123 of the relay device.

Likewise, according to the above-mentioned embodiment of the present invention, the display unit 145 of the other party's communication device 14 displays in letters the above-mentioned microphone switch message and the above-mentioned telephone conversation ending announcement message. However, it is possible that the message generation unit 122*c* of the relay device generates the microphone switch message and the telephone conversation ending announcement message by voice signals, the relay device sends the voice signals to the other party's communication device 14, and the speaker 142 of the other party's communication device 14 changes the voice signals into voice and outputs the voice by superimposing the user's voice.

Further, according to the above mentioned embodiment of the present invention, the relay device 12 sends the microphone switch message to the other party's communication 14 only when the relay device 12 switches from the microphone 111 of the communication device to the microphone 121 of the relay device. However, it is possible that the relay device 12 also sends the microphone switch message to the communication device 14 when the connection is reestablished and the relay device 12 switches from the microphone 121 of the relay device to the microphone 111 of the communication device 11.

Then, according to the embodiment of the present invention, when momentary disconnection in the local wireless communication path occurs, to try a reestablishment of the connection in the local wireless communication path, the relay device 12 sends the connection request packet and the connection confirmation packet to the communication device 11 while the communication device 11 sends the connection request reception packet to the relay device 12. It is possible, on the contrary, that the communication device 11 sends the connection request packet and the connection confirmation packet to the relay device 12 and the relay device 12 sends the connection request reception packet to the communication device 11.

Furthermore, according to the embodiment of the present invention, when a momentary disconnection in the local wireless communication path occurs, the conditions under which relay device 12 sends the telephone conversation ending announcement message to the other party's communication 14 are when the relay device 12 detects the abnormal status, and does not detect the normal status after the passage of a certain amount of time. However, it is possible that the conditions are when after the relay device 12 tries to reestablish the connection in the local wireless communication path for a certain number of times, the relay device 12 does not detect the normal status of the communication in the local wireless communication path. Similarly, the conditions under which the relay device 12 cuts off the telephone conversation with the other party's communication device 14 may be after the relay device 12 sends the telephone conversation ending announcement message to the other party's communication device 14 and tries to reestablish the connection in the local wireless communication path for a certain number of times.

Likewise, after the relay device 12 detects the abnormal status of the communication in the local wireless communication path and a certain time has passed, the relay device 12 sends the telephone conversation ending announcement message and cuts off the telephone message. However, it is possible that as a preliminary step before the relay device 12 cuts off the telephone conversation, when the relay device 12 receives an instruction to continue the telephone conversation from the user, the relay device 12 does not cut off the telephone conversation, and the user can continue the telephone conversation using the relay device 12.

What is claimed is:

1. A hands-free telephone conversation system comprising:
   a communication device; and
   a relay device,
   wherein the communication device includes:
   a first voice input unit operable to receive voice from a user;
   a voice output unit operable to output voice of an other party of a telephone conversation; and
   a first wireless communication unit operable to wirelessly send the user's voice to the relay device, and to wirelessly receive the other party's voice from the relay device, and
   wherein the relay device includes:
   a second voice input unit operable to receive voice from the user;
   a second wireless communication unit operable to wirelessly send the other party's voice to the communication device, and to wirelessly receive the user's voice from the communication device;
   a first wireless communication status detection unit operable to detect a status of the wireless communication between the first wireless communication unit and the second wireless communication unit;
   a voice input switch unit operable to select either the first voice input unit or the second voice input unit based on a detection result of the first wireless communication status detection unit;
   a network communication unit operable to send the user's voice that is received by the selected one of the first voice input unit and the second voice input unit to a communication device of the other party of the telephone conversation through a communication network; and
   a voice input switch message generation unit operable to generate a message that notifies the other party of the telephone conversation of a selection by the voice input switch unit,
   wherein the network communication unit sends the message generated by the voice input switch message generation unit to the other party's communication device through the communication network.

2. The hands-free telephone conversation system according to claim 1,
   wherein the voice input switch unit selects the second voice input unit when the status of the wireless communication detected by the first wireless communication status detection unit is determined to be abnormal, and
   wherein the voice input switch unit selects the first voice input unit when the status of the wireless communication is determined to be normal.

3. The hands-free telephone conversation system according to claim 1,
   wherein the relay device further includes:
   a first wireless communication retrial unit operable to try to reconnect with the communication device when the status of the communication detected by the wireless communication status detection unit is determined to be abnormal.

4. The hands-free telephone conversation system according to claim 1,
   wherein the first wireless communication status detection unit detects the status of the wireless communication by a presence or an absence of receiving a packet.

5. The hands-free telephone conversation system according to claim 1,
   wherein the first wireless communication status detection unit detects the status of the wireless communication by detecting a level of an electric field received at the communication device of the user.

6. The hands-free telephone conversation system according to claim 1,
wherein the communication device further includes:
a second wireless communication status detection unit operable to detect the status of the wireless communication between the first wireless communication unit and the second wireless communication unit; and
a second wireless communication retrial unit operable to try to reconnect with the relay device when the status detected by the second wireless communication status detection unit is determined to be abnormal.

7. The hands-free telephone conversation system according to claim 6,
wherein the second wireless communication status detection unit detects the status of the wireless communication by a presence or an absence of receiving a packet.

8. The hands-free telephone conversation system according to claim 6,
wherein the second wireless communication status detection unit detects the status of the wireless communication by detecting a level of an electric field received at the communication device of the user.

9. A relay device operable to wirelessly receive a user's voice from a communication device, the relay device comprising:
a voice input unit operable to receive voice from the user;
a wireless communication unit operable to wirelessly send and receive voice to and from the communication device;
a wireless communication status detection unit operable to detect the status of the wireless communication with the communication device;
a voice input switch unit operable to select either the communication device or the voice input unit based on a detection result of the wireless communication status detection unit;
a network communication unit operable to send the voice received from the selected one of the communication device and the voice input unit to a communication device of an other party of a telephone conversation through a communication network; and
a voice input switch message generation unit operable to generate a message that informs the other party of the telephone conversation of a switch by the voice input switch unit,
wherein the network communication unit sends the message generated by the voice input switch message generation unit to the other party's communication device through the communication network.

10. The relay device according to claim 9,
wherein the voice input switch unit selects the voice input unit when the status of the wireless communication detected by the wireless communication status detection unit is determined to be abnormal, and selects the voice reception from the communication device when the status is determined to be normal.

11. The relay device according to claim 9,
wherein the relay device further includes:
a wireless communication retrial unit operable to try to reconnect with the communication device when the status of the wireless communication is determined to be abnormal by the wireless communication status detection unit.

12. A relay device operable to wirelessly receive a user's voice from a communication device, the relay device comprising:
a wireless communication unit operable to wirelessly send and receive voice to and from the communication device;
a wireless communication status detection unit operable to detect a status of the wireless communication with the communication device;
a network communication unit operable to send and receive the voice to and from an other party's communication device through a communication network; and
a network communication disconnection unit operable to cut off the connection with the other party's communication device through the communication network based on a detection result of the wireless communication status detection unit;
a voice input unit operable to receive voice from the user; and
a voice input switch unit operable to select either the communication device or the voice input unit based on a detection result of the wireless communication status detection unit,
wherein the network communication unit is operable to send the voice received from the selected one of the communication device and the voice input unit to the other party's communication device through the communication network,
wherein the relay device further includes a voice input switch message generation unit operable to generate a message that informs the other party of the telephone conversation of a switch by the voice input switch unit, and
wherein the network communication unit sends the message generated by the voice input switch message generation unit to the other party's communication device through the communication network.

13. The relay device according to claim 12,
wherein the relay device further includes:
a time measurement unit operable to measure an elapsed time after the wireless communication status detection unit detects the wireless communication status, and
wherein the network communication disconnection unit cuts off the connection with the other party's communication device through the communication network when the time measurement unit measures a passage of a certain amount of time after the wireless communication status detection unit detects an abnormal status.

14. The relay device according to claim 12,
wherein the relay device further includes:
a wireless communication retrial unit operable to try to reconnect with the communication device when the wireless communication status is determined to be abnormal based on the detection result of the wireless communication status detection unit; and
a trial frequency counting unit operable to count a retrial frequency of the wireless communication retrial unit, and
wherein the network communication disconnection unit cuts off the connection with the other party's communication device through the communication network when the trial frequency counting unit counts a certain number of trials after the wireless communication status detection unit detects an abnormal status.

15. The relay device according to claim 12,
wherein the relay device further includes:
a telephone conversation ending message generation unit operable to generate a message to inform the other party of the telephone conversation that the telephone conversation will end; and a network transmission unit operable to send the message generated by the telephone conversation ending message generation unit to the other party's communication device through the communication network.

16. A hands-free telephone conversation method for a system comprising a communication device and a relay device,
   wherein the communication device is operable to execute a method comprising:
   a first voice input step of receiving voice from a user;
   a voice output step of outputting voice from an other party of the telephone conversation; and
   a first wireless communication step of wirelessly sending the user's voice to the relay device, and wirelessly receiving the other party's voice from the relay device, and
   wherein the relay device is operable to execute a method comprising:
   a second voice input step of receiving voice from the user;
   a second wireless communication step of wirelessly sending the other party's voice to the communication device, and wirelessly receiving the user's voice from the communication device;
   a wireless communication status detection step of detecting a status of the wireless communication between the communication device and the relay device;
   a voice input switch step of selecting either the first voice input step or the second voice input step based on a detection result of the wireless communication status detection step;
   a network communication step of sending the user's voice received in the selected one of the first voice input step and the second voice input step to a communication device of the other party through a communication network; and
   a voice input switch message generation step of generating a message that notifies the other party of the telephone conversation of a selection in the voice input switch step,
   wherein the network communication step comprises sending the message generated in the voice input switch message generation step to the other party's communication device through the communication network.

* * * * *